(12) United States Patent
Shin et al.

(10) Patent No.: US 9,868,474 B2
(45) Date of Patent: Jan. 16, 2018

(54) REINFORCEMENT STRUCTURE FOR REAR FLOOR OF VEHICLE

(71) Applicant: Hyundai Motor Company, Seoul (KR)

(72) Inventors: Seongsu Shin, Seoul (KR); Soo Heung Eom, Gyeonggi-do (KR); Joonam Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/180,261

(22) Filed: Jun. 13, 2016

(65) Prior Publication Data

US 2017/0158250 A1 Jun. 8, 2017

(30) Foreign Application Priority Data

Dec. 8, 2015 (KR) .......................... 10-2015-0174462

(51) Int. Cl.
*B62D 25/00* (2006.01)
*B62D 25/20* (2006.01)

(52) U.S. Cl.
CPC ................................ *B62D 25/2027* (2013.01)

(58) Field of Classification Search
CPC .............................. B62D 21/152; B62D 25/20
USPC ....................................... 296/203.04, 187.11
See application file for complete search history.

(56) References Cited

U.S. PATENT DOCUMENTS

| 5,788,322 A * | 8/1998 | Wolf ................... B62D 25/088 |
| | | 296/181.4 |
| 2011/0175401 A1* | 7/2011 | Fujimura ........... B62D 25/2027 |
| | | 296/203.04 |
| 2014/0015282 A1* | 1/2014 | Kim ..................... B62D 25/087 |
| | | 296/193.02 |

FOREIGN PATENT DOCUMENTS

| JP | 4556596 B2 | 10/2010 |
| KR | 10-2007-0049854 A | 5/2007 |
| KR | 10-1325380 B1 | 11/2013 |
| KR | 2015-0062044 A | 6/2015 |

* cited by examiner

*Primary Examiner* — Joseph D Pape
(74) *Attorney, Agent, or Firm* — Mintz Levin Cohn Ferris Glovsky and Popeo, P.C.; Peter F. Corless

(57) ABSTRACT

A reinforcement structure for a rear floor of a vehicle includes a rear floor panel, a first cross member extending along a vehicle width direction to be combined with a rear end of the rear floor panel, a side member combined with a side portion of the rear floor panel, a side seal combined with the side member, an extension panel combined with a rear end of the rear floor panel and including a tunnel portion, and a second cross member extending along the vehicle width direction and being combined with the first cross member and the side member, wherein the first cross member and the second cross member are directly combined with the extension panel, and one end of the second cross member is bent to be combined with the first cross member, and the first cross member and the second member form a ring shape at both sides of the tunnel portion.

6 Claims, 6 Drawing Sheets

REINFORCEMENT STRUCTURE FOR REAR FLOOR OF VEHICLE

CROSS-REFERENCE TO RELATED APPLICATION

This application claims under 35 U.S.C. §119(a) the benefit of Korean Patent Application No. 10-2015-0174462 filed in the Korean Intellectual Property Office on Dec. 8, 2015, the entire contents of which are incorporated herein by reference.

BACKGROUND

(a) Field of the Invention

The present invention relates to a reinforcement structure for a rear floor of a vehicle applied to a cross member having a ring-shaped structure.

(b) Description of the Related Art

A rear floor interim portion of a vehicle connects a center floor forming a bottom surface of the vehicle and a rear floor forming a rear seat hip portion basic surface, and enables overcoming a height difference, supporting an occupant space, and increasing distortion strength of the vehicle.

However, since a height difference between the center floor and the rear floor may be increased due to environmental and/or safety regulations, the previously-mentioned functional role cannot be sufficiently obtained by current techniques such as only supporting by a panel or one reinforcement member crossing the transverse direction. Particularly, in the current interim portion structure, the reinforcement member cannot evenly transmit collision energy to a vehicle body when subject to a side surface collision and cannot distribute a load when a bending load is applied to the vehicle body.

Therefore, when a side surface collision or bending load is applied to the vehicle body, energy absorption performance may be reduced, thus increasing side surface damage and distortion damage to the vehicle.

The above information disclosed in this Background section is only for enhancement of understanding of the background of the invention and therefore it may contain information that does not form the prior art that is already known in this country to a person of ordinary skill in the art.

SUMMARY

The present invention provides a reinforcement structure for a rear floor of a vehicle provided with an interim portion having a dual ring-shaped structure, in which the reinforcement structure has advantages of improving collision performance, distortion strength, and rear seat package durability.

A reinforcement structure for a rear floor of a vehicle according to an exemplary embodiment of the present invention includes a rear floor panel, a first cross member extending along a vehicle width direction to be combined with a rear end of the rear floor panel, a side member combined with a side portion of the rear floor panel, a side seal combined with the side member, an extension panel combined with a rear end of the rear floor panel and including a tunnel portion, and a second cross member extending along the vehicle width direction and being combined with the first cross member and the side member, wherein the first cross member and the second cross member are directly combined with the extension panel, and one end of the second cross member is bent to be combined with the first cross member, and the first cross member and the second member form a ring shape at both sides of the tunnel portion.

The first cross member may be bent at both sides to have a '⌐' shape.

The second cross member may be combined with the extension panel and provided in plural in a symmetrical shape along the vehicle width direction.

The second cross member may be configured in a shape corresponding to the tunnel portion.

One end of the second cross member may have a slope toward the first cross member.

The other end of the second cross member may be combined with the side seal.

According to an exemplary embodiment of the present invention, distortion strength of the vehicle body may be improved by combining and connecting the cross members at a left side and a right side of the side member, and bending strength may be improved by providing a dual ring-shaped structure of a tunnel portion.

Further, side collision performance may be improved by diversity of a load path during a side surface collision.

In addition, occupants may not be injured by securing an amount of kickup of the interim portion for a submarining response.

DETAILED DESCRIPTION OF THE EMBODIMENTS

Figure 1:
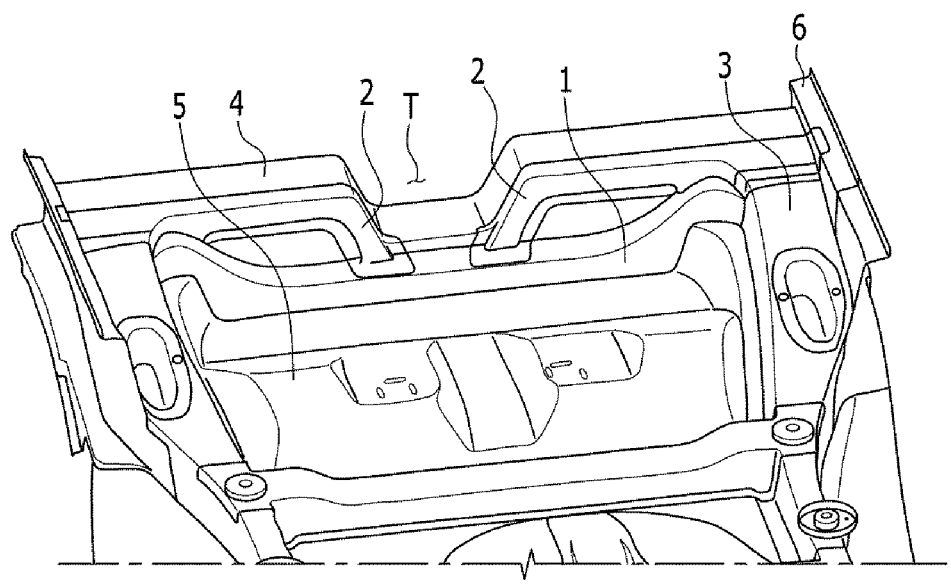
FIG. 1 is a perspective view of a reinforcement structure of a rear floor according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

Further, in exemplary embodiments, since like reference numerals designate like elements having the same configuration, a first exemplary embodiment is representatively described, and in other exemplary embodiments, only a configuration different from the first exemplary embodiment will be described.

It shall be noted that the drawings are schematic and do not depict exact dimensions. The relative proportions and ratios of elements in the drawings may be exaggerated or diminished for the sake of clarity and convenience in the drawings, and such arbitrary proportions are only illustrative and not limiting in any way. Like reference numerals are used for like structures, elements, or parts shown in two or more drawings to show similar characteristics. When one part is said to be "over" or "on" another part, the one part may be directly over or on the other part or there may be another part interposed therebetween.

Exemplary embodiments of the present invention specifically show preferred exemplary embodiments of the present invention. As a result, various modifications of the drawings are anticipated. Therefore, the exemplary embodiments are not limited to a specific form of an illustrated region, and, for example, include modifications of a manufactured form.

Hereinafter, a reinforcement structure of a rear floor according to an exemplary embodiment of the present invention will be described with reference to FIG. 1 and FIG. 2.

Figure 2:
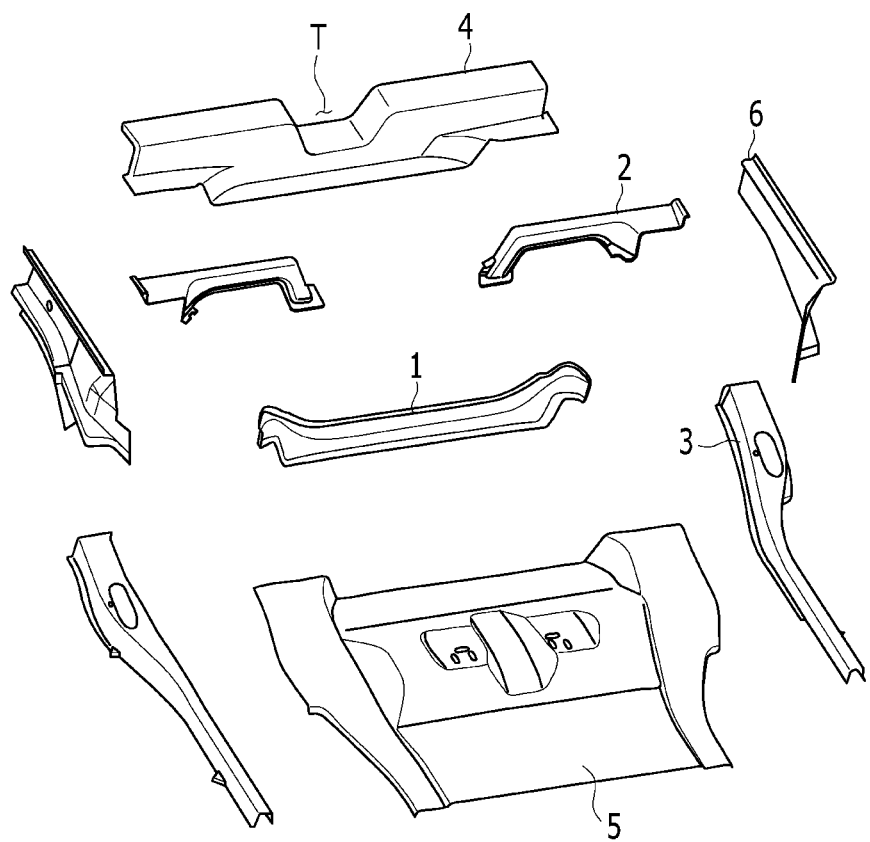
FIG. 2 is an exploded parts view of the reinforcement structure of FIG. 1.

FIG. 1 is a perspective view illustrating a reinforcement structure of a rear floor according to an exemplary embodiment of the present invention, and FIG. 2 is an exploded parts view illustrating the reinforcement structure of FIG. 1.

Referring to FIG. 1, a reinforcement structure of a rear floor of a vehicle includes a rear floor panel 5, a first cross member 1, a side member 3, a side seal 6, an extension panel 4, and a second cross member 2.

The first member 1 extends along a vehicle width direction and is combined with a rear end of the rear floor panel 5

The first cross member 1 preferably is bent at both sides to have a '⊔' shape. Both sides of the first member 1 are combined with a side member 3 located at a side part of the rear floor panel 5.

The side member 3 is combined with the side part of the rear floor panel 5, and may be combined with a lower side surface of the rear floor panel 5 by welding.

The side seal 6 is combined with the side surface of the side member 3, and the extension panel 4 is combined with a rear side of the rear floor panel 5. A center part of the extension panel 4 includes a tunnel portion T provided with a tunnel shape.

The second cross member 2 extends along the vehicle width direction and is combined with a front surface of the extension panel 4. The second cross member 2 may be provided in plural (e.g., two second cross members 2) with a symmetrical shape along the vehicle width direction.

The second cross member 2 is bent in a shape corresponding to the tunnel portion T of the extension panel 4 and combined with the first cross member 1. One end of the second cross member 2 may have a sloped shape toward the first cross member 1 at the tunnel portion T.

One end of the second cross member 2 is bent to be combined with the first cross member 1, and the other end of the second cross member 2 is combined with the end of the side member 3 and the side surface of the side seal 6.

The first cross member 1 and the second cross member 2 may be attached to the front surface of the extension panel 4 forming a ring shape.

Referring to FIG. 2, the reinforcement structure of the rear floor may include one extension panel 4, one first cross member 1, one rear floor panel 5, two second cross members 2, two side seals 6, and two side members 3. The two side members 3 and the two side seals may be respectively combined with the side part of the rear floor panel 5 based on the rear floor panel, the first cross member 1 and the extension panel 4 may be combined with the upper side of the rear floor panel 5, and the second cross member 2 may be bent to be combined with the upper side of the first cross member 1 and the front surface of the extension panel 4.

Figure 3:
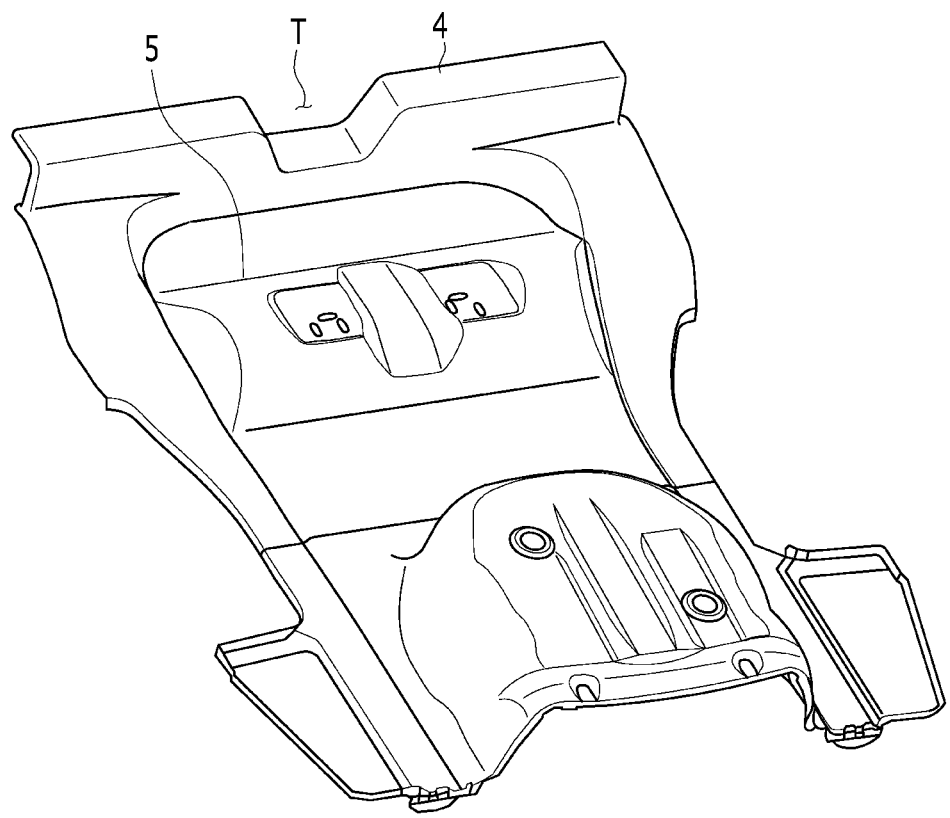
FIG. 3 is a perspective view illustrating a combined state of an extension panel and a rear floor panel according to an exemplary embodiment of the present invention.

FIG. 3 is a perspective view illustrating a combined state of an extension panel and a rear floor panel according to an exemplary embodiment of the present invention. As shown in FIG. 3, the extension panel 4 is combined with the upper side of the rear floor panel 5 including the tunnel portion T. A space equipped with a fuel tank (not shown) may be provided at the lower end center of the rear floor panel 5.

Figure 4:
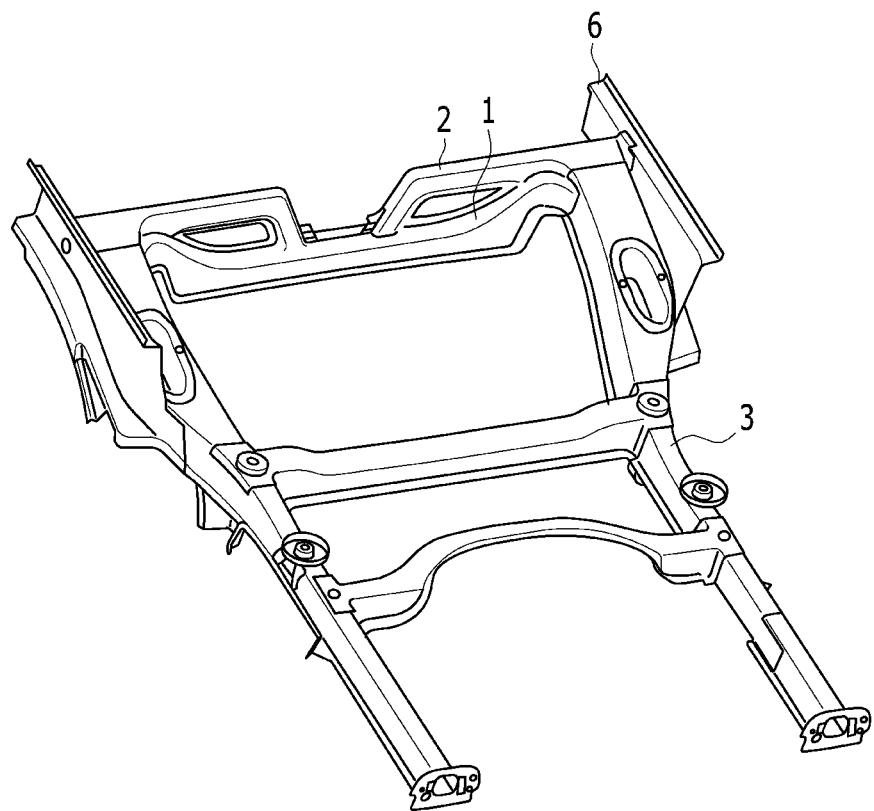
FIG. 4 is a perspective view illustrating a combined state of cross members, a side member, and a side seal according to an exemplary embodiment of the present invention.

FIG. 4 is a perspective view illustrating a combined state of cross members, a side member, and a side seal according to an exemplary embodiment of the present invention. Referring to FIG. 4, the first cross member 1 may be bent to have a '⊔' shape. The second cross member 2 is combined with the upper side of the first cross member 1 with a bent shape so that the first cross member 1 and the second cross member 2 form a ring-shaped structure. The side part of the second cross member 2 is combined with the side seal 6 and to the upper surface of the side member 3.

Figure 5:
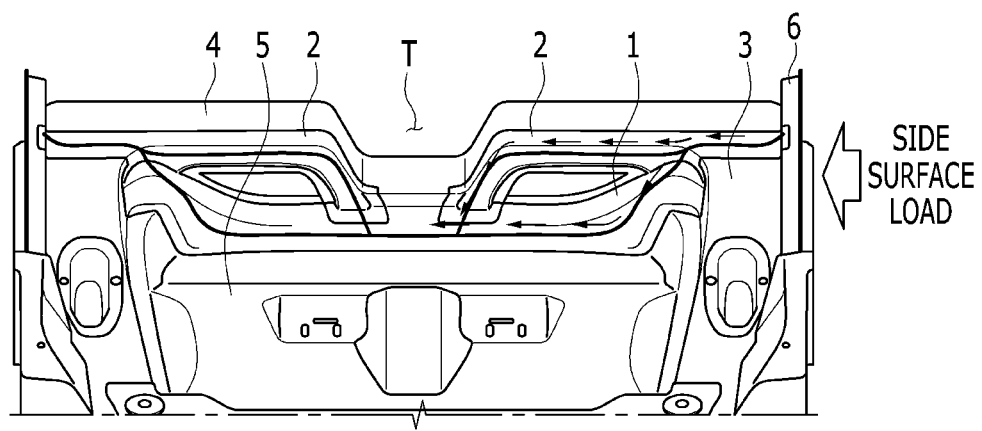
FIG. 5 is a schematic view illustrating that a side surface load is transmitted to the reinforcement structure of the rear floor according to an exemplary embodiment of the present invention.

FIG. 5 is a schematic view illustrating that a side surface load is transmitted to the reinforcement structure of the rear floor according to an exemplary embodiment of the present invention. Referring to FIG. 5, the reinforcement structure forms a ring shape at both a left side and a right side of the tunnel portion T by having the first cross member 1 and the second cross member 2 connect the tunnel portion T and the side member 3.

When a load is applied from the side surface, the load is transmitted along the first cross member 1 and the second cross member 2 to distribute the entire load. Accordingly, resistance against left and right distortion is increased, and collision performance and distortion strength are improved by distributing the load path during a side surface collision.

Figure 6:
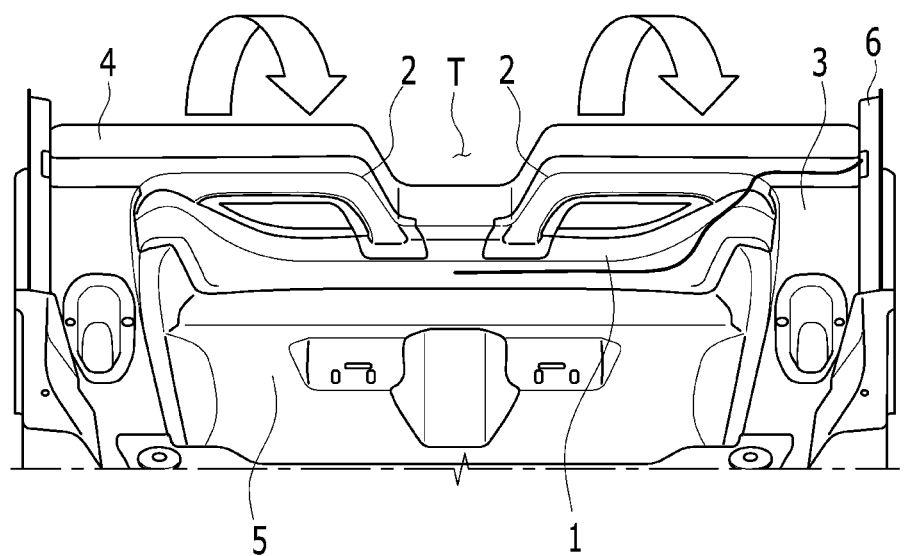
FIG. 6 is a schematic view illustrating that a bending load is transmitted to the reinforcement structure of the rear floor according to an exemplary embodiment of the present invention.

FIG. 6 is a schematic view illustrating that a bending load is transmitted to the reinforcement structure of the rear floor according to an exemplary embodiment of the present invention. Referring to FIG. 6, the load is distributed through the second cross member 2 when a bending load is applied to the vehicle by providing the second cross member 2 connecting the tunnel portion T and the side member 3. The tunnel portion T may not be split by distributing the bending load, so the bending strength may be increased.

As described above, according to the present invention, distortion strength of the vehicle body may be improved by combining and connecting the cross members at left and right sides of the side member, and bending strength may be improved by providing a dual ring-shaped structure of the tunnel portion.

Further, side collision performance may be improved by diversity of the load path during a side surface collision.

Further, injury to occupants may be prevented by securing an amount of kickup of the interim portion for a submarining response.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A reinforcement structure for a rear floor of a vehicle, comprising:
    a rear floor panel;
    a first cross member extending along a vehicle width direction to be combined with a rear end of the rear floor panel;
    a side member combined with a side portion of the rear floor panel;
    a side seal combined with the side member;
    an extension panel combined with a rear end of the rear floor panel and including a tunnel portion; and
    a second cross member extending along the vehicle width direction and being combined with the first cross member and the side member,
    wherein the first cross member and the second cross member are directly combined with the extension panel, and
    one end of the second cross member is bent to be combined with the first cross member, and the first cross member and the second member form a ring shape at both sides of the tunnel portion.

2. The reinforcement structure of claim 1, wherein the first cross member is bent at both sides to have a '⊔' shape.

3. The reinforcement structure of claim 1, wherein the second cross member is combined with the extension panel and provided in plural in a symmetrical shape along the vehicle width direction.

4. The reinforcement structure of claim 1, wherein the second cross member is configured in a shape corresponding to the tunnel portion.

5. The reinforcement structure of claim 1, wherein one end of the second cross member has a slope toward the first cross member.

6. The reinforcement structure of claim 5, wherein the other end of the second cross member is combined with the side seal.

* * * * *